No. 872,285. PATENTED NOV. 26, 1907.
E. A. HOLLENBECK.
CORN HARVESTING AND HUSKING MACHINE.
APPLICATION FILED SEPT. 10, 1906.
4 SHEETS—SHEET 1.
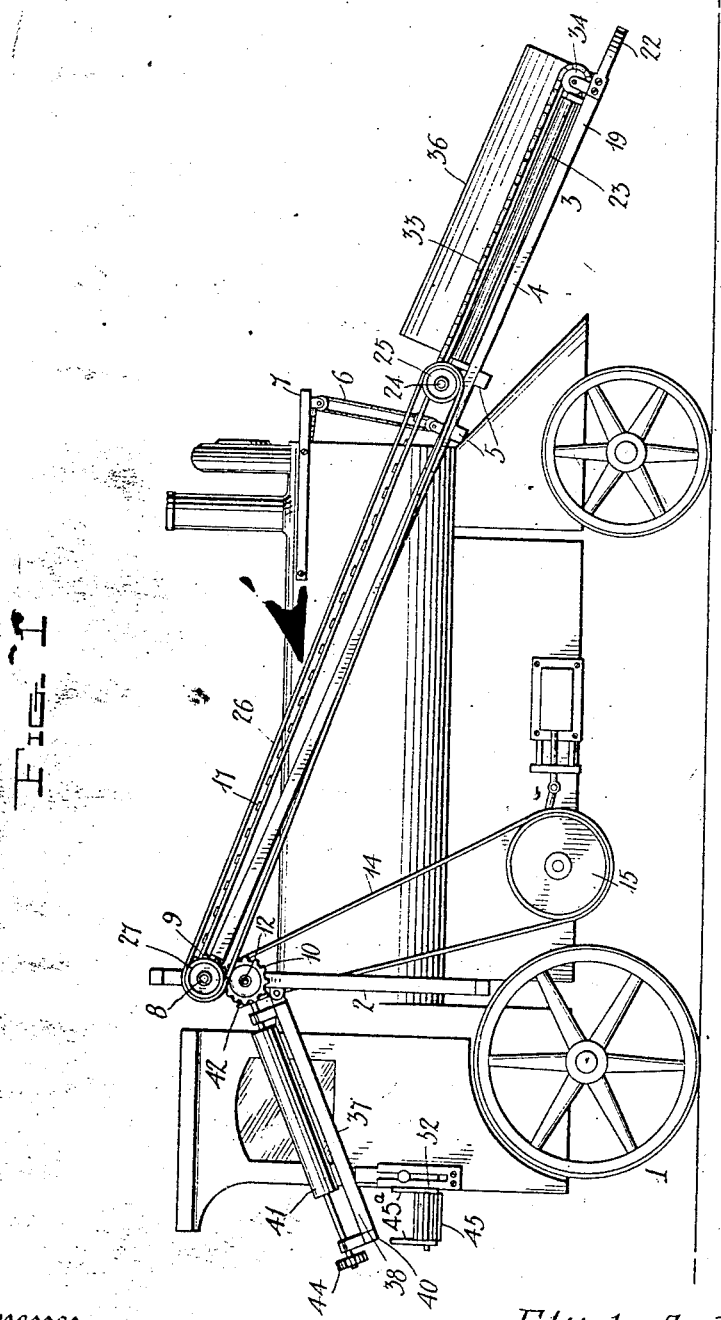
Inventor
Elijah A. Hollenbeck No. 872,285. PATENTED NOV. 26, 1907.
E. A. HOLLENBECK.
CORN HARVESTING AND HUSKING MACHINE.
APPLICATION FILED SEPT. 10, 1906.
4 SHEETS—SHEET 2.
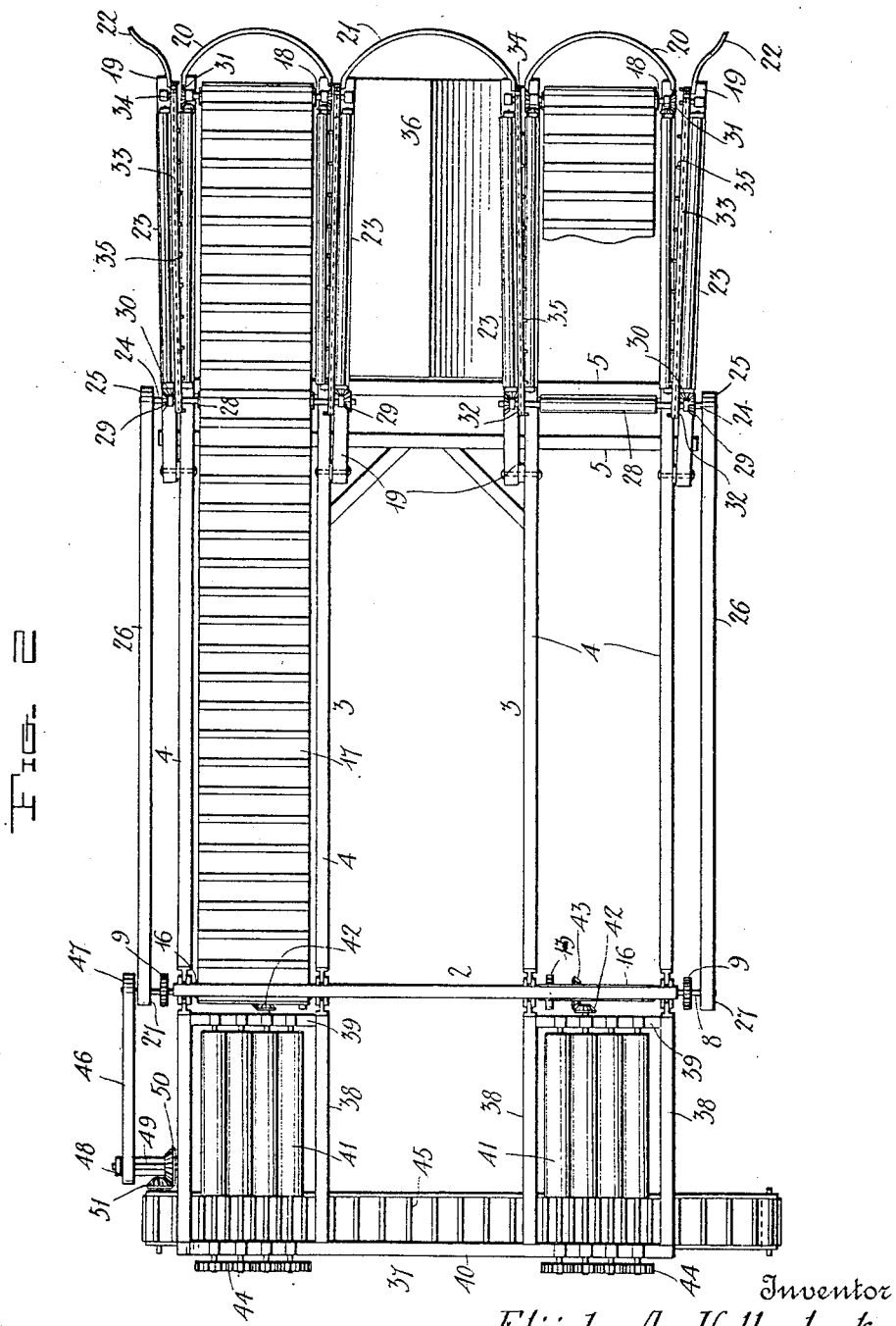
Witnesses
Inventor
Elijah A. Hollenbeck
by
Attorneys

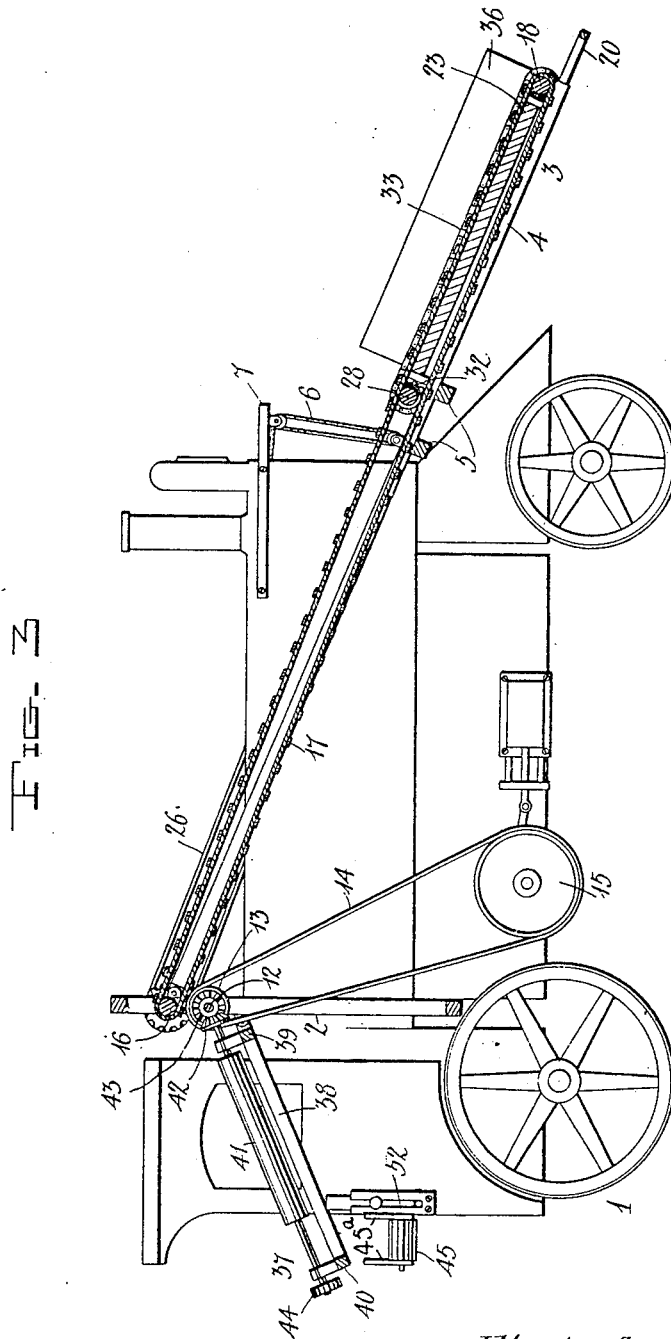

No. 872,285. PATENTED NOV. 26, 1907.
E. A. HOLLENBECK.
CORN HARVESTING AND HUSKING MACHINE.
APPLICATION FILED SEPT. 10, 1906.
4 SHEETS—SHEET 4.
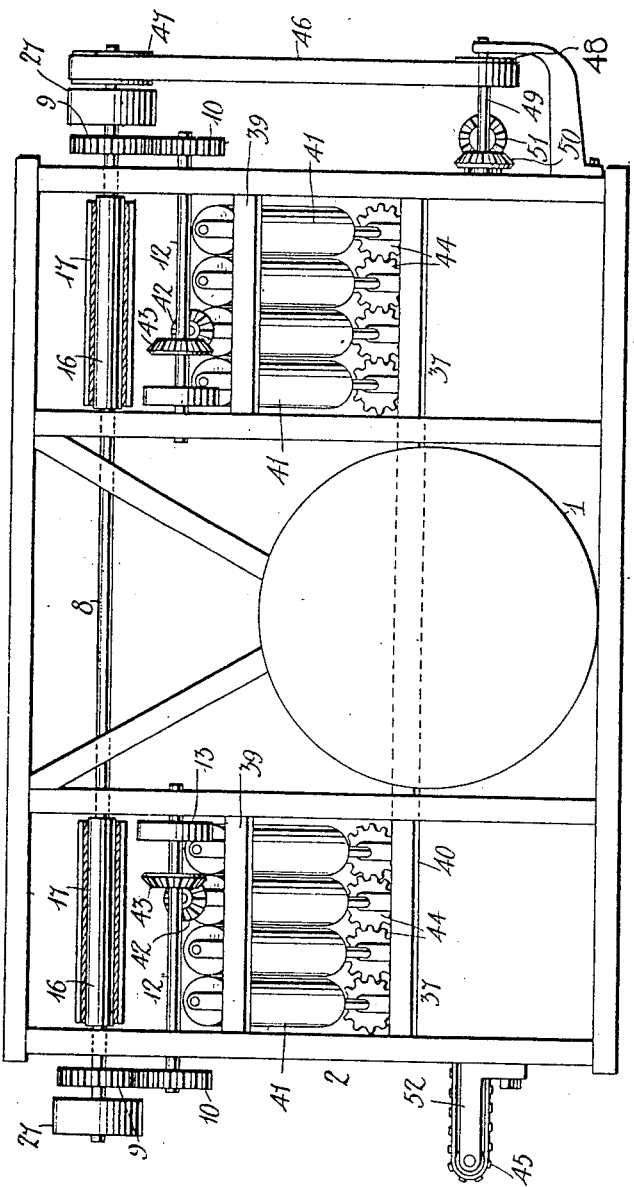
Witnesses
Inventor
Elijah A. Hollenbeck
by H. B. Willson & Co.
Attorneys

UNITED STATES PATENT OFFICE.

ELIJAH A. HOLLENBECK, OF FUNK, NEBRASKA.

CORN HARVESTING AND HUSKING MACHINE.

No. 872,285.

Specification of Letters Patent.

Patented Nov. 26, 1907.

Application filed September 10, 1906. Serial No. 333,954.

*To all whom it may concern:*

Be it known that I, ELIJAH A. HOLLENBECK, a citizen of the United States, residing at Funk, in the county of Phelps and State of Nebraska, have invented certain new and useful Improvements in Corn Harvesting and Husking Machines; and I do declare the following to be a full, clear, and exact description of the invention, such as will enable others skilled in the art to which it appertains to make and use the same.

This invention relates to improvements in corn harvesting and husking machines.

The object of the invention is to provide a machine of this character adapted to be applied to a traction engine, from which the power is obtained for propelling the machine as well as for operating the working parts thereof.

With the above and other objects in view, the invention consists of certain nove' features of construction, combination and arrangement of parts, as will be hereinafter described and claimed.

In the accompanying drawings:—Figure 1 is a side view of a corn harvesting and husking machine constructed in accordance with the invention; Fig. 2 is a top plan view of the same; Fig. 3 is a vertical longitudinal sectional view through one side of the machine; Fig. 4 is a vertical cross sectional view, taken immediately in front of and looking toward the main supporting frame.

Referring more particularly to the drawings, 1 denotes a traction engine, which may be of any suitable construction. Mounted on the framework of the engine immediately in front of the cab and extending on both sides of the boiler is a main upright supporting frame 2, upon which the operating mechanism and working parts of the machine are mounted. Hingedly connected to the forward side of the frame 2 are parallel, forwardly and downwardly projecting conveyer frames 3, consisting of parallel, longitudinally-disposed side bars 4 which are connected immediately in front of the boiler by parallel cross bars 5. The frames 3 are adjustably supported near their forward ends by a block and tackle connection 6 to forwardly projecting supporting beams 7 secured to the forward upper end of the boiler, as shown. By means of the block and tackle connection, the forward ends of the frames 3 may be raised or lowered to any desired elevation.

Mounted in the main upright frame 2 near the upper end thereof is a horizontal, transversely-disposed drive shaft 8, on which near its outer ends are mounted spur gear wheels
9. The gear wheels 9 are engaged by similar gear wheels 10 mounted on the outer ends of counter drive shafts 12 journaled in the frame 2. On one of the shafts 12 is mounted a drive pulley 13, which is connected by a belt 14 to the fly wheel 15 of the engine, by means of which power is imparted to the drive shaft 8.

On the drive shaft 8 near the opposite sides of the frame 2 are mounted conveyer rolls 16, around which pass endless slatted conveyers 17, said conveyers also passing around rolls 18 journaled in the forward ends of the parallel conveyer frame bars 4. The conveyers 17 are adapted to travel between the bars 4, as will be understood.

Secured to the cross bars 5 of the conveyer frame are guide bars 19, which project forwardly on a level with the forward ends of the conveyer frame bars 4 and diverge slightly from the same toward their outer ends, thereby forming wedge-shaped spaces between said outer ends of the conveyer frame bars 4 and themselves. The outer ends of the conveyer frame bars 4 are connected by a forwardly-projecting bail-shaped guide strap or bar 20. The inner guide bars 19 are connected by a similar strap or bar 21 while the forward ends of the outer guide bars 19 have connected thereto outwardly and laterally curved guide fingers or bars 22. The guide bars or straps 20 and 21 and the guide fingers 22 form flaring or outwardly diverging gathering arms by means of which rows of corn stalks are gathered and directed in between the guide bars 19 and the forward ends of the conveyer frame bars 4.

Journaled in suitable bearings on the guide bars 19 and the forward ends of the conveyer frame bars 4 are pairs of snapping rolls 23.
These pairs of rolls 23 are obliquely-disposed relatively to each other to provide wedge-shaped spaces between them coincident with the wedge-shaped spaces between the guide bars 19 and the outer ends of the conveyer frame bars 4, so that when the corn stalks are gathered in by said bars, the ears thereon will be snapped off by the rolls 23 and will fall onto the conveyers 17, by means of which they are elevated or carried upwardly and rearwardly and discharged upon the husking mechanism hereinafter to be described.

On the bars 4 of the conveyer frame near the inner ends of the snapping rolls are journaled drive shafts 24, on the outer ends of which are mounted pulleys 25 connected by belts 26 to drive pulleys 27 on the main drive shaft 8 in the supporting frame 2. On the shafts 24 are mounted conveyer rolls 28, over which the conveyers 17 travel and by means of which the upper stretch of the same are supported near their forward ends. Also mounted on the shafts 24 are beveled gear wheels 29, which are adapted to mesh with similar gears 30 on the inner ends of the outer roll of each pair of snapping rolls, whereby said outer rolls are driven. The inner rolls of each pair of snapping rolls are driven by means of beveled gears 31 mounted on the ends of the shafts of the lower conveyer rolls 18. Mounted on the shaft 24 between the inner ends of each pair of snapping rolls are sprocket gears 32, around which are adapted to pass sprocket chains 23. The outer or forward ends of the sprocket chains 23 pass around idle sprocket gears 34 mounted on the outer end of the guide bars 19. The sprocket chains 33 are provided at suitable intervals with laterally-projecting lugs 35, which as the chain travels around the snapping rolls, said lugs are adapted to engage the stalks, which have been gathered in between the snapping rolls to aid in drawing the stalks inwardly, thus facilitating the snapping of the ears therefrom by the snapping rolls. If desired the space between the inner pair of guide arms 19 may be covered by an upwardly-curved or V-shaped plate 36, which will prevent the ears detached by the inner pairs of snapping rolls from falling between said inner pairs of guide bars, thus causing all of the ears to be directed onto the conveyers 17 after being detached from the stalks.

Hingedly connected to the rear side of the supporting frame 2 immediately below the upper ends of the conveyers 17 is a husking roll frame 37. This roll frame 37 consists of pairs of longitudinally-disposed side bars 38, said pairs of bars being arranged on each side of the engine cab, as shown. The bars 38 are connected near their upper ends by cross bars 39 and at their lower ends by a single cross bar 40. Journaled in the upper and lower cross bars of the frame 37 are husking rolls 41, said rolls being arranged in pairs, there being preferably two pairs of the same between each pair of side bars 38 of the husking frame. The shaft of one of the rolls 41 at each side of the frame is extended forwardly and provided with a beveled gear 42, said beveled gear being engaged by similar gears 43 mounted on the drive shafts 12 in the frame 2 of the machine, by means of which the rolls having the extending shafts are driven. The shafts of the rolls 41 are projected rearwardly therefrom through the lower rear cross bar 40 of the husking frame, and on said projecting ends of the shaft are journaled a series of intermeshing gears 44, by means of which the movement of the driven roll of each set is imparted to the others, so that as the ears are discharged thereon by the conveyers 17, they will be caught and husked by said rolls and the husks passed through the rolls while the cleaned ears will be discharged from the lower ends thereof onto a suitable endless conveyer 45 by means of which they are carried to and deposited into a wagon or other receptacle provided therefor. Side boards $45^a$ are shown to prevent the husked ears from rebounding from the conveyer 45. The conveyer 45 is driven by means of a belt 46 which passes around a pulley 47 on the main drive shaft 8 and around a pulley 48 on a stub shaft 49 journaled on the side of the engine cab, as clearly shown in Figs. 1 and 3 of the drawings. On the shaft 49 is also mounted a beveled gear 50, which is adapted to engage a beveled gear 51 on the shaft of one of the supporting rolls of the conveyer 45. The rear end of the husking roll frame 37 is supported upon brackets 52 which are adjustably connected in any suitable manner to the sides of the engine cab, whereby the rear or lower end of the husking frame may be raised or lowered to any suitable elevation.

By means of a corn harvester and husking machine such as herein shown and described the ears from four rows of corn will simultaneously be removed and husked. By arranging the operating mechanism upon a traction engine, the working parts of the machine may be kept running after the propelling mechanism of the engine has been stopped for any reason, thereby providing for the husking of the ears left on the machine after the engine has ceased to move, so that when another start is made the working parts of the machine will have been cleaned out, thus preventing any clogging or overaccumulation of ears upon the working mechanism of the machine.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. A corn harvesting and husking machine of the character described comprising a traction engine a main supporting frame mounted upon the engine, forwardly and downwardly-projecting conveyer frames hingedly connected at their inner ends to said main frame, a block and tackle connection to support the forward ends of said frames, snapping rolls journaled on said forward ends of the conveyer frames, husking frames hingedly connected at their inner ends to said main supporting frame, adjustable brackets to support the outer ends of said husking frames, a series of husking rolls journaled in each of said husking frames, an endless conveyer adapted to conduct the ears from said snapping rolls to said husking rolls, an endless conveyer arranged beneath the discharge ends of said husking rolls to receive the cleaned ears therefrom, a main drive shaft journaled in said main frame, means whereby said shaft is driven from the fly wheel of the engine, and means whereby the motion of said shaft is imparted to the working parts of the machine, substantially as described.

2. In a corn harvesting and husking machine of the character described comprising a traction engine having a cab, a main supporting frame mounted upon the engine, conveyer frames hingedly mounted at their inner ends on said main frame, and projecting forwardly on each side of the engine boiler, a main drive shaft journaled in said main supporting frame, conveyer rolls on said shaft, similar rolls journaled in the outer ends of said conveyer frames, endless conveyers on said rolls, counter drive shafts mounted in said main frame, means whereby one of said counter shafts is connected to and driven by the fly wheel of the traction engine, gears to connect said counter shafts with the main drive shaft, whereby the latter is driven, guide bars secured to the outer ends of said conveyer frames to form wedge-shaped guideways, snapping rolls journaled on said guide bars and the ends of the conveyer frame, means to guide the corn stalks between said rolls, endless sprocket chains adapted to travel over the rolls, said chains having lugs formed thereon to engage corn stalks and draw the same into engagement with the snapping roll, means whereby said rolls and chains are driven from said main drive shaft, husking roll frames mounted on said main supporting frame and projecting rearwardly and downwardly on each side of the engine cab, pairs of husking rolls journaled on each of said frames, means whereby one roll in each of said pairs is geared to and driven by said counter drive shafts, a series of gears mounted on the rear ends of said husking roll shaft, whereby the motion of said driven rolls is imparted to the others, an endless conveyer arranged beneath the discharge end of said husking rolls, and means whereby said conveyer is driven from the main drive shaft of the machine, substantially as described.

In testimony whereof I have hereunto set my hand in presence of two subscribing witnesses.

ELIJAH A. HOLLENBECK.

Witnesses:
EUGENE W. REED,
ETTA PEERSON,